United States Patent
Shenoy et al.

(10) Patent No.: US 11,710,479 B1
(45) Date of Patent: Jul. 25, 2023

(54) CONTEXTUAL BIASING OF NEURAL LANGUAGE MODELS USING METADATA FROM A NATURAL LANGUAGE UNDERSTANDING COMPONENT AND EMBEDDED RECENT HISTORY

(71) Applicant: Amazon Technologies, Inc., Seattle, WA (US)

(72) Inventors: Ashish Vishwanath Shenoy, Seattle, WA (US); Sravan Babu Bodapati, Redmond, WA (US); Katrin Kirchhoff, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 142 days.

(21) Appl. No.: 17/218,813

(22) Filed: Mar. 31, 2021

(51) Int. Cl.
 *G10L 15/183* (2013.01)
 *G10L 15/06* (2013.01)
 *G10L 15/18* (2013.01)
 *H04L 51/02* (2022.01)

(52) U.S. Cl.
 CPC .......... *G10L 15/183* (2013.01); *G10L 15/063* (2013.01); *G10L 15/1815* (2013.01); *H04L 51/02* (2013.01)

(58) Field of Classification Search
 CPC . G10L 15/183; G10L 15/063; G10L 15/1815; H04L 51/02
 See application file for complete search history.

(56) References Cited

U.S. PATENT DOCUMENTS

| | | | |
|---|---|---|---|
| 2018/0129484 A1* | 5/2018 | Kannan ................. | G06F 3/0482 |
| 2018/0232645 A1* | 8/2018 | Finkelstein ........... | H04W 4/029 |
| 2019/0042988 A1* | 2/2019 | Brown .................. | G06N 5/022 |
| 2020/0226475 A1* | 7/2020 | Ma ....................... | G06N 3/0472 |
| 2020/0227025 A1* | 7/2020 | DiMascio .............. | G10L 15/22 |
| 2021/0065680 A1* | 3/2021 | Audhkhasi ............ | G10L 15/063 |
| 2021/0073337 A1* | 3/2021 | Jiang .................... | G06N 3/006 |
| 2021/0083996 A1* | 3/2021 | Moon ................... | H04L 51/046 |
| 2021/0097110 A1* | 4/2021 | Asthana ............ | G06F 16/90332 |
| 2021/0134319 A1* | 5/2021 | Vatanparvar ......... | A61B 5/0823 |
| 2021/0157989 A1* | 5/2021 | Orr ....................... | G06F 40/30 |
| 2021/0217408 A1* | 7/2021 | Hakkani-Tur ........ | G06F 40/284 |
| 2021/0386313 A1* | 12/2021 | Krishnamoorthy .. | G06N 3/0454 |

(Continued)

*Primary Examiner* — Bhavesh M Mehta
*Assistant Examiner* — Darioush Agahi
(74) *Attorney, Agent, or Firm* — Nicholson De Vos Webster & Elliott LLP

(57) ABSTRACT

Techniques for implementing a chatbot that utilizes context embeddings are described. An exemplary method includes determining a next turn by: applying a language model to the utterance to determine a probability of a sequence of words, generating a context embedding for the utterance based at least on one or more of: a dialog act as defined by a chatbot definition of the chatbot, a topic vector identifying a domain of the chatbot, a previous chatbot response, and one or more slot options; performing neural language model rescoring using the determined probability of a sequence of words as a word embedding and the generated context embedding to predict an hypothesis; determining at least a name of a slot and type to be fulfilled based at least in part on the hypothesis and the chatbot definition; and determining a next turn based at least in part on the chatbot definition, any previous state, and the name of the slot and type to be fulfilled.

20 Claims, 10 Drawing Sheets

(56) References Cited

U.S. PATENT DOCUMENTS

| | | | |
|---|---|---|---|
| 2022/0139384 A1* | 5/2022 | Wu | G06F 40/30 |
| | | | 704/257 |
| 2022/0157301 A1* | 5/2022 | O'Connor | H04L 12/1831 |
| 2022/0230462 A1* | 7/2022 | Xu | G06V 30/19147 |
| 2022/0230632 A1* | 7/2022 | Maitra | G06V 20/41 |
| 2022/0253611 A1* | 8/2022 | Galitsky | G06K 9/6201 |
| 2022/0270597 A1* | 8/2022 | Qiu | G10L 25/30 |

* cited by examiner

```
BOT DEFINITION
                              301
INTENT: PLAN TRIP [
        INPUT CONTEXT: XYZ
        SAMPLE UTTERANCES FOR INTENT:
                "I WOULD LIKE TO PLAN A TRIP"
                "I WANT TO GO ON VACATION"
        SLOTS: START_DATE:BUILT-IN TYPE
               END_DATE:BUILT-IN TYPE
               LOCATION_TO:BUILT-IN TYPE
               LOCATION_FROM:BUILT-IN TYPE
        SAMPLE UTTERANCES FOR SLOTS:
                "WHERE DO YOU WANT TO GO?"
                "WHERE DO YOU WANT TO COME BACK?"
                "WHERE DO YOU WANT TO GO?"
                "WHERE ARE YOU LEAVING?"
        OUTPUT CONTEXT: PTDONE
]
INTENT: BOOK FLIGHT [
        INPUT CONTEXT: PTDONE
        SAMPLE UTTERANCES FOR INTENT:
                "I WOULD LIKE TO BOOK A FLIGHT"
        SLOTS: START_DATE:BUILT-IN TYPE
               END_DATE:BUILT-IN TYPE
               LOCATION_TO:BUILT-IN TYPE
               LOCATION_FROM:BUILT-IN TYPE
        SAMPLE UTTERANCES FOR SLOTS:
                "WHEN DO YOU WANT TO LEAVE?"
                "WHEN DO YOU WANT TO COME BACK?"
                "WHERE DO YOU WANT TO GO?"
                "WHERE DO YOU WANT TO RETURN?"
        OUTPUT CONTEXT: BFDONE
]
 . . .
```

*FIG. 3*

CONTEXTUAL BIASING OF NEURAL LANGUAGE MODELS USING METADATA FROM A NATURAL LANGUAGE UNDERSTANDING COMPONENT AND EMBEDDED RECENT HISTORY

BACKGROUND

Conversational interfaces and transcription services are two important use cases that can benefit from context in previous utterances. Unlike a voice search application, where most of the conversations are short-form and the queries can vary over a wide range of domains, use cases in conversational interfaces and transcription services generally tend toward goal-oriented conversations which can sometimes span multiple turns.

BRIEF DESCRIPTION OF DRAWINGS

Various embodiments in accordance with the present disclosure will be described with reference to the drawings, in which:

FIG. 3 illustrates an embodiment of an exemplary bot definition.

DETAILED DESCRIPTION

The present disclosure relates to methods, apparatus, systems, and non-transitory computer-readable storage media for implementing a chatbot that may account for recent interactions. Rather than decoding each utterance independently, there can be benefit in decoding these utterances based on the context in which previous utterances are being spoken. In the case of grocery shopping for example, knowing that the context is "what kind of laundry detergent?" should help in disambiguating "pods" from "pause".

One way approaching this problem is to introduce explicit biasing. This is where explicit grammars are created to model the interactions when a user in a particular skill/bot. The drawback of this approach is that it is not scalable as its rigid and the grammars need to be manually written to cover all scenarios. Neural language models both recurrent and transformer based, have the ability to take advantage of implicit biasing using the context vector. Some systems are trained to evaluate both conversational interfaces and transcription neural language models by treating each sentence in the corpus independently and thus resetting the context for every segment/utterance. Strong cues from natural language understanding (NLU) model can be used along with a bot response and the bot definition to bias a generic neural language model (NLM) toward each user with a minimal change to the NLM architecture.

Unfortunately, in some instances user utterances cannot be stored and/or the sample utterances provided in the bot definition may not match the eventual usage pattern. The use of an embedding bypasses the need to store explicit utterances. Additionally, using explicit utterances is computational expensive and may introduce more errors when the training examples (e.g., from a bot definition) are too different than an incoming utterance.

Detailed herein are embodiments that allow a user to use a chatbot that is adapted to embedded utterances in recent history for the user. In essence, the use of embedded utterances allows for self-training of a chatbot. For example, the use of embeddings allows for a more efficient finding of similarity between an utterance and a sample to be used to predict an hypothesis.

Figure 1:
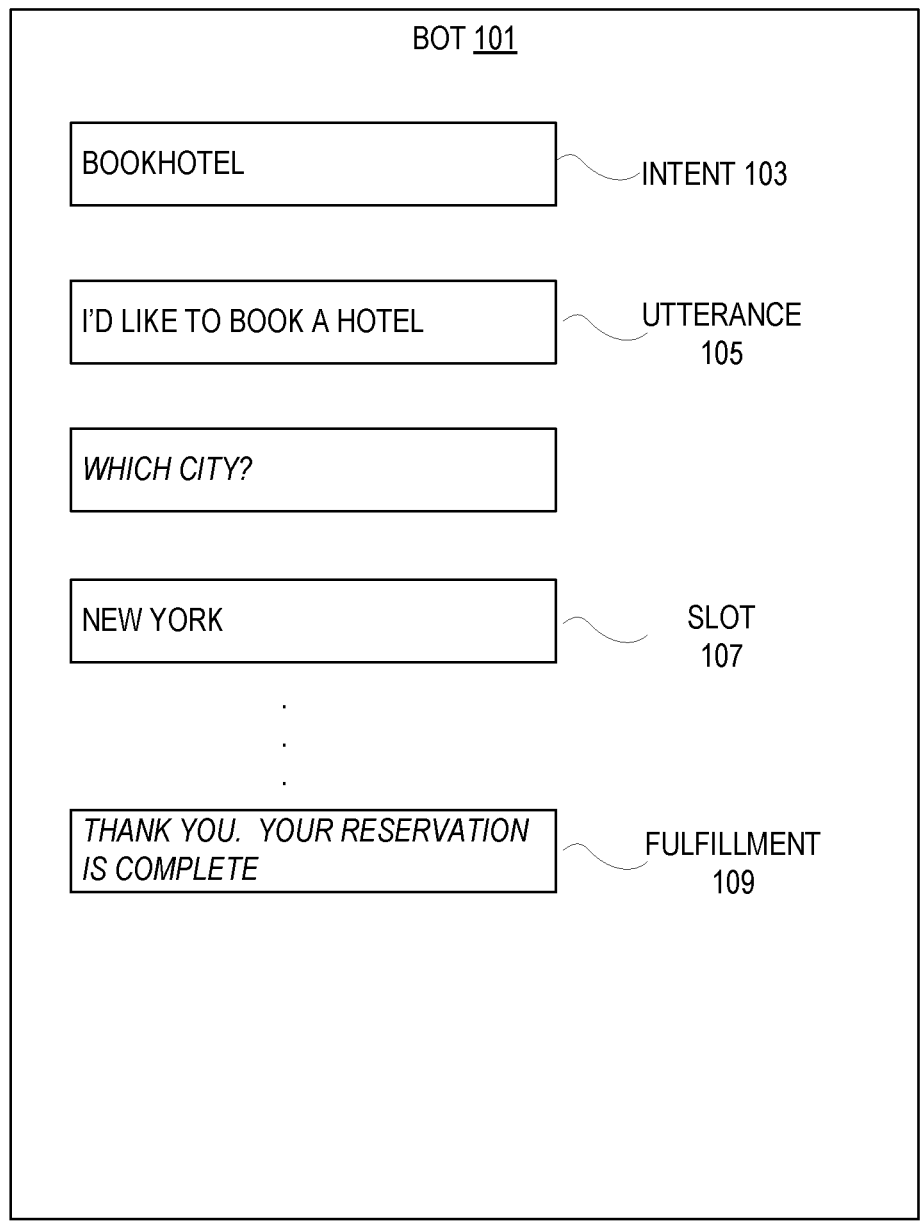
FIG. 1 illustrates an embodiment of a bot usage.

FIG. 1 illustrates an embodiment of a bot usage. In this example, the bot 101 is used to intake user utterance (such as utterances) and provide responses to the input (shown in italics). In this example, the intent 103 of the bot 101 is to book a hotel. An intent represents an action to take in response to natural language input. In particular, an intent is a task/goal for an agent (such as a chatbot) that is necessary in order to fulfill a user's request. Intents may use (1) custom slot types defined specifically for a domain (e.g., a "book_hotel" slot for a trip planning domain) or (2) built-in slot types that can express intents that are general enough to be applied across many domains (e.g., a "greeting" slot which can be applied to almost any domain). A slot is a list of values used to train a machine learning model to recognize values for a slot (e.g., the value "New York" in this example).

A user provides an utterance 105 in the form of a spoken or typed phrase that invokes the intent 103. Slots 107 are input data required to fulfill an intent. As such, slots 107 represent parameters that have to be asked and assigned values in order to fulfill an intent in a user's request. For example, in order to successfully complete a book_hotel reservation, an agent would require information about multiple slots such as, for example, the "start_date" and the "end_date" (which represent the check-in and check-out dates), the "location_to" (which represents the place where the user is traveling to) and other preferences of the user like "price_range." The list of possible values these slots 107 may be restricted to include (1) custom values (for the example dataset above, "location_to" can be the name of a U.S. city such as, for example, San Jose, Seattle, etc.) or (2) built-in types, such as builtin.date for the slot labeled "start_date" or "end_date."

Finally, the bot 101 provides an indication of fulfillment 109.

Figure 2:
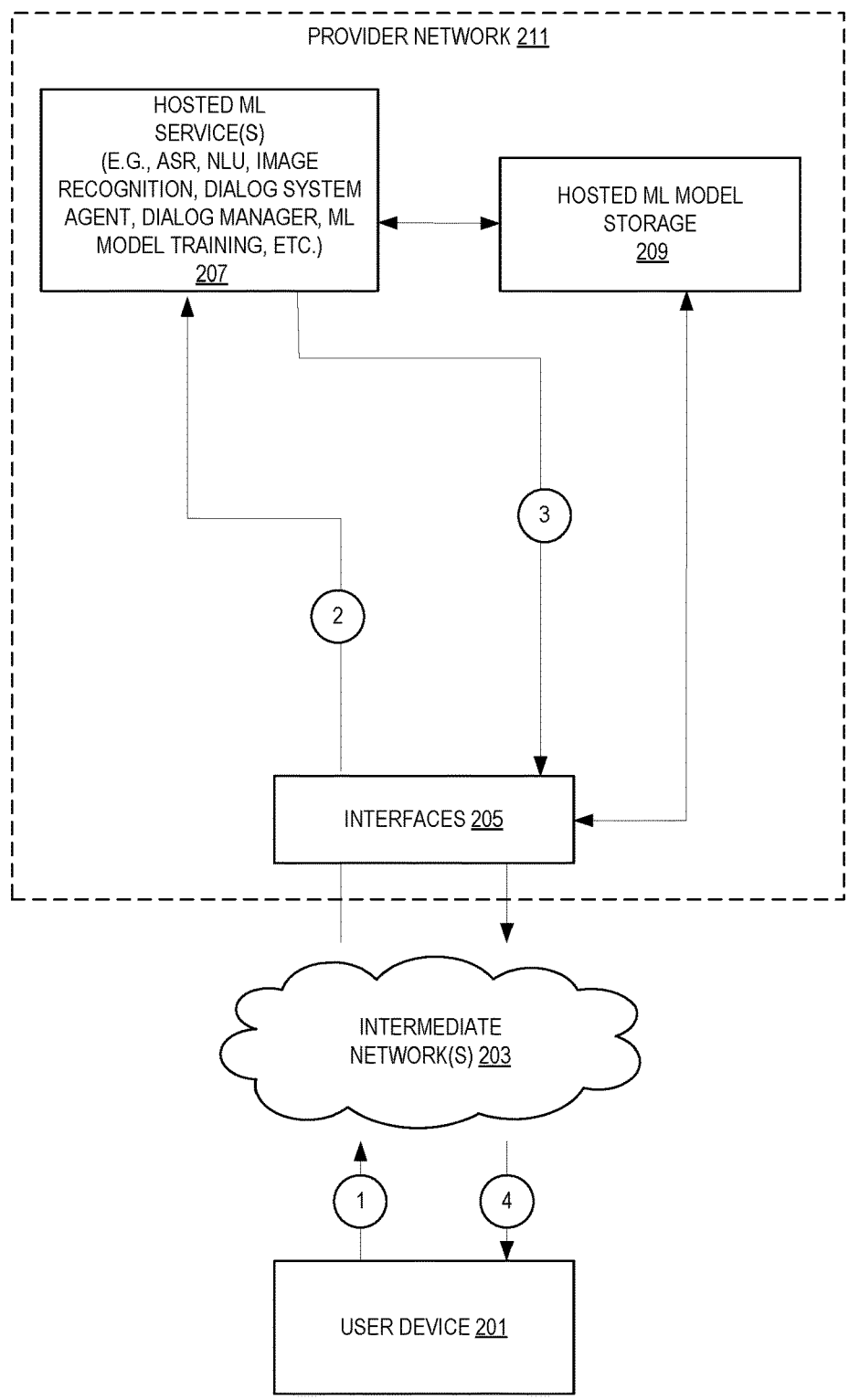
FIG. 2 illustrates embodiments of a system for training a bot and/or hosting a bot or other service including for performing inference for natural language understanding (NLU), image recognition, and/or automatic speech recognition (ASR).

FIG. 2 illustrates embodiments of a system for training a bot and/or hosting a bot or other service including for performing inference for natural language understanding (NLU), image recognition, and/or automatic speech recognition (ASR). As shown, a provider network 211 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. for at least NLU. These and other computing resources may be provided as services, such as a hardware virtualization service that can execute compute instances, a storage service that can store data objects, etc. The users (or "customers") of provider networks 211 may utilize one or more user accounts that are associated with a customer account, though these terms may be used somewhat interchangeably depending upon the context of use. User devices 201 may interact with a provider network 211 across one or more intermediate networks 203 (e.g., the internet) via one or more interface(s) 205, such as through use of application programming interface (API) calls, via a console implemented as a website or application, etc. The interface(s) 205 may be part of, or serve as a front-end to, a control plane of the provider network 211 that includes "backend" services supporting and enabling the services that may be more directly offered to customers.

To provide these and other computing resource services, provider networks 211 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks or may indirectly utilize a compute instance by submitting code to be executed by the provider network, which in turn utilizes a compute instance to execute the code (typically without the user having any control of or knowledge of the underlying compute instance(s) involved).

In this illustration, the provider network 211 provides several bot related services including, for example, NLU services, ASR services, support for hosting a dialog system agent, dialog training data generation, machine learning (ML) model training (e.g., bot training), etc.

When the application 207 is a bot, the illustrated circles represent actions that may occur. As shown, at circles 1 and 2, a user device 201 communicates with the provider network 211 via intermediate networks 203 and interfaces 205. In particular, the user device 201 communicates with a hosted ML service 207 (such as a bot). An example of a communication is an "utterance" to be handled by the bot. The hosted ML service 207 hosts ML models for different entities on a shared fleet of physical and/or virtual hosts. The hosted ML models may be custom (for example, user provided) or provided by the service. The bot may call other hosted ML services 207 such as the ASR and NLU services in response to received utterances, etc. Hosted ML model storage 209 stores models for NLU services, ASR services, support for hosting a dialog system agent, dialog training data generation, and ML model training.

The results of the bot are returned at circle 3 and then forwarded back to the user device 201 as needed in circle 4.

A provider network 211 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 211 may use one or more user accounts that are associated with a customer account, though these terms may be used somewhat interchangeably depending upon the context of use. Users may interact with a provider network 211 across one or more intermediate networks 203 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 211 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to an AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 100 often rely upon virtualization techniques. For example, virtualization technologies may provide users the ability to control or use compute resources (e.g., a "compute instance," such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly use a compute resource (e.g., provided by a hardware virtualization service) hosted by the provider network to perform a variety of computing tasks. Additionally, or alternatively, a user may indirectly use a compute resource by submitting code to be executed by the provider network (e.g., via an on-demand code execution service), which in turn uses one or more compute resources to execute the code—typically without the user having any control of or knowledge of the underlying compute instance(s) involved.

Figure 4:
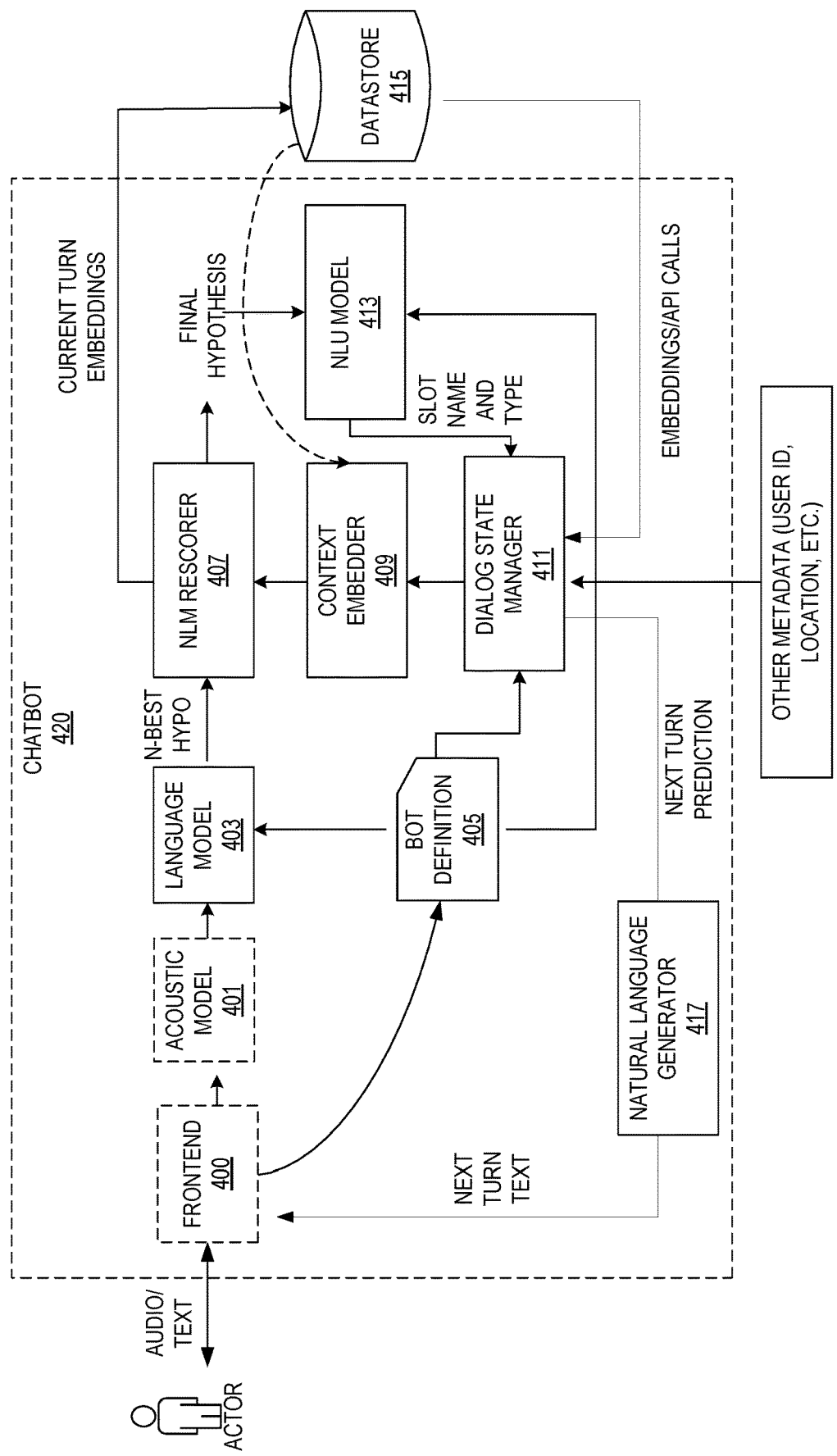
FIG. 4 illustrates embodiments of a contextual neural language model chatbot system.

FIG. 4 illustrates embodiments of a contextual neural language model chatbot system 400. As shown a user may provide audio to an acoustic model 401 which predicts the probability of characters in a given input. Language model 403 computes a probability of a sequence of words (such as from characters of a given input) as the N-best hypotheses. For example, the probability of a sequence of words W= $w_1, \ldots, w_{1N}$ as $$p(W) = \prod_{i=1}^{N} p(w_i \mid h_i)$$

where p(W) is the probability of the sequence and $h_i$ is the hidden state vector for the word $w_i$. In some embodiments, this sequence comes from the acoustic model 401.

A bot definition 405 defines a chatbot 420. The bot definition 405 may include one or more of: a conversation flow, intent details (an intent a name and description to help identify the purpose of the intent), contexts that set the input and output contexts for the intent (where a context is a state variable associated with an intent and an output context is set when an intent is fulfilled), sample utterances (e.g., a plurality of phrases that you expect your users to use to trigger an intent), slots (defining the slots, or parameters, required to fulfill the intent. Each slot has a type that defines the values that can be entered in the slot and each slot can be custom or built-in), confirmation prompts and declination responses (these responses are used to end the conversation with a user and to confirm or decline fulfillment of the intent), closing responses (text sent to the user after the intent is fulfilled), and/or codehooks to a function to initialize the intent, validate user utterance, and/or to fulfill the intent. In some embodiments, a bot definition is a JavaScript Object Notation (JSON) file. FIG. 3 illustrates an embodiment of an exemplary bot definition. As shown, a bot definition 301 includes a plurality of intents (only two are shown) with each intent including one or more slots to fill in and their types, examples of slot prompts, and examples of utterances that signal the intent.

A dialog state manager 411 tracks a state of a conversation in current session. In some embodiments, a conversation can be in any of the following states: 1) ElicitIntent which indicates that the bot has not yet determined the user's intent; 2) ElicitSlot which indicates that the bot has detected the user's intent and is gathering the required information to fulfill the intent; 3) ConfirmIntent which indicates that the bot is waiting for the user to confirm that the information collected is correct; or 4) closed which indicates that the user's intent is complete and that the conversation with the bot reached a logical end.

A user can specify a new intent after the first intent is completed. An intent can have the one of the following states: 1) InProgress which indicates that the bot is gathering information necessary to complete the intent; 2) Waiting which indicates that the user requested the bot to wait when the bot asked for information for a specific slot; 3) Fulfilled which indicates that the business logic associated with the intent ran successful; 4) ReadyForFulfillment which indicates that the bot gathered all of the information required to fulfill the intent and that the client application can run fulfillment business logic; or 5) Failed which indicates that an intent has failed.

In some embodiments, the dialog state manager 411 tracks a session identifier, the state (including current act), and the location within a bot definition. The dialog state manager 411 may provide contextual metadata to a context embedder 409 such as, for example, one or more of: a normalized dialog act and slot name (such as, for example, example SlotValueElicitation(CityName) where the act is "SlotValueElicitation" and the slot name is CityName), a previous bot response, a list of slot options in the current turn (which is dependent on the slot), and/or a topic vector or a dimensional vector representing a domain of the bot definition. For example, contextual information may be in a form where the items shown in a row are separated by a character such as | or an identifier such as <dialog_act>:

| Normalized Dialog Act and Slot Name | Previous Bot Response | Slot Options | Topic Vector |
|---|---|---|---|
| SlotValueElicitation(CityName) | "Which city did you mean?" | Seattle Portland | Vector from a domain classification model |

In some embodiments, the dialog state manager 411 also takes in other context metadata such as the user identifier interacting with the chatbot, the time of the interactions, the language being used, video data, image representations, etc.

The dialog state manager 411 also predicts a next turn or action given the output of the bot definition 405, the datastore 415 (holding embeddings for turns and/or results of API calls), and the NLU model 413. In some embodiments, the dialog state manager 411 provides the predicted next turn to a Natural Language Generator (NLG) 417 to convert the predicted action into text.

The context embedder 409 takes in a normalized dialog act, other metadata, and/or a topic vector from the dialog state manager 411, a previous bot response (from the datastore 415 or dialog state manager 411), and a list of slot options and/or intent classification from the NLU model 413 and generates one or more context embeddings from the contextual metadata. These context embeddings represent the contextual metadata without having to save the metadata (conversations) and are of a fixed length. In some embodiments, the saving of utterances, etc. is not desired for privacy or other reasons. How these context embeddings are generated is flexible and itself be context/dialog state dependent.

A neural language model (NLM) rescorer 407 takes into account contextual information in the form of embeddings to determine a final hypothesis of an utterance (e.g., its content and/or meaning) to provide to a natural language understanding (NLU) model 413 which maps utterance, provided image, or response text into a semantic representation to determine a slot name and/or type. In particular, the NLM rescorer 407 uses the context embeddings to perform contextual and domain adaptable rescoring. The NLM rescorer 407 also stores the current turn's embeddings (context and/or word) in datastore 415.

Figure 5:
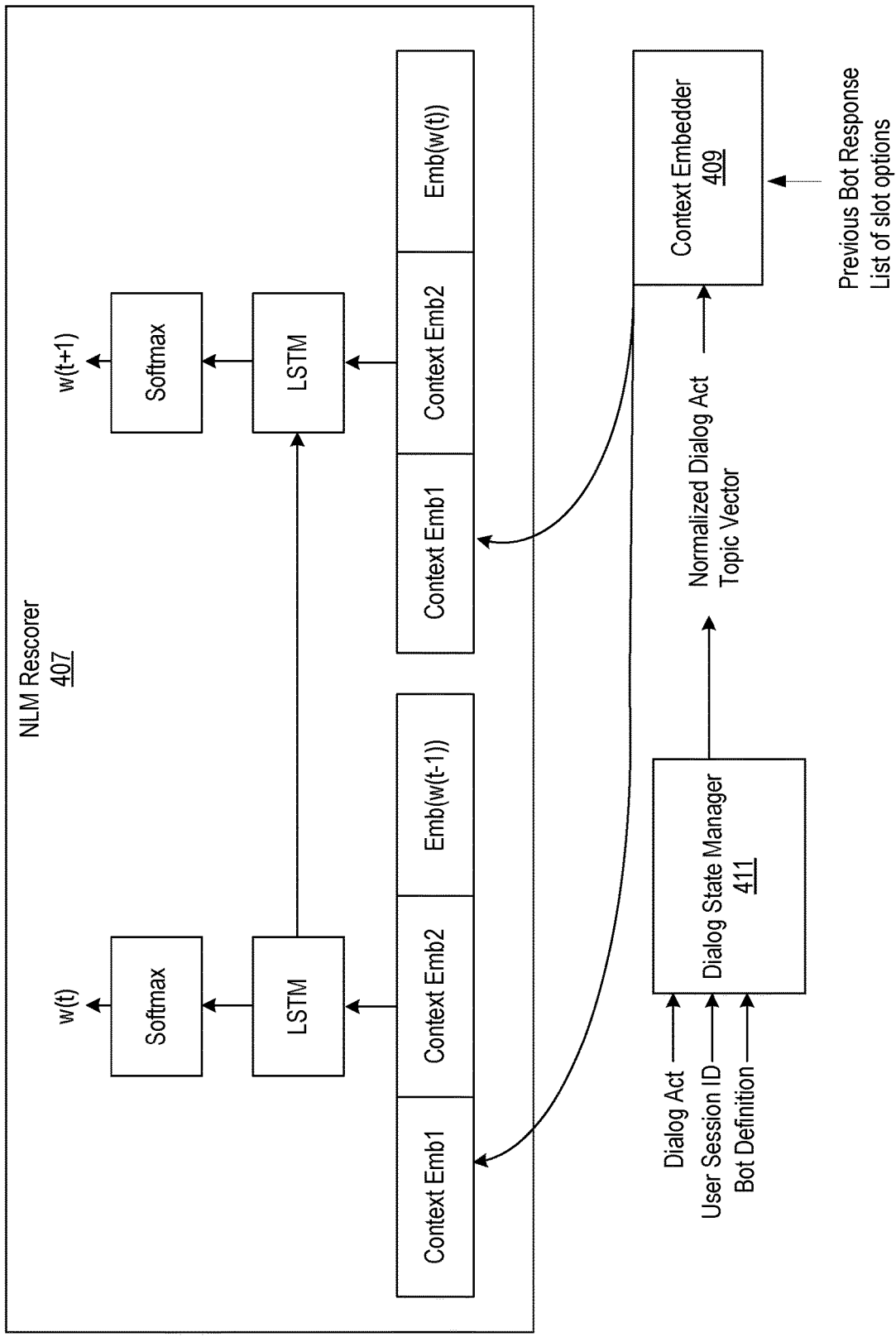
FIG. 5 illustrates a more detailed representation of a NLM rescorer according to some embodiments.

FIG. 5 illustrates a more detailed representation of the NLM rescorer 407 according to some embodiments. The NLM rescorer 407 improves on the language model by augmenting the input to long short-term memories (LSTMs) with contextual information $ctx_i$ to predict a next word in a sequence:

$$p(W) = \prod_{i=1}^{N} p(w_i \mid h_i, ctx)$$

In some embodiments, a LSTM model is trained and evaluated sentence-wise as a baseline. Consider $w_0, w_1 \ldots w_n$ to be a sequence of words in a dialog turn, the probability $p(w_i \mid w_{<i})$ is summarized as $$embed_i = E_{ie}^T w_{i-1}$$

$$c_i, h_i = LSTM(w_{i-1}, c_{i-1}, embed_i)$$

$$p(w_i, w_{<i}) = Softmax(W_{ho}^T h_i)$$

where $embed_i$ is the word embedding (shown as Emb(w(t)) and Emb(w(t-1)) in FIG. 5 from the language model), $c_i$ is the context embedding, and the output from the LSTM is projected to word level outputs using $W_{ho}^T$ and then a softmax layer converts the word level outputs into final word level probabilities (the hypothesis).

A way of achieving contextual language modeling in LSTM-LMs is to carry over the fixed size context vectors $c_i$ and $h_i$ after the last time step in the previous turn to the initial state in the current turn as shown in FIG. 5. Specifically, the dialog act and bot response prime the model for the current user turn. An example of normalized dialog act is changing confirm or recommend to confirm.

The dialog act and the bot response are concatenated in some embodiments. In some embodiments, they are separated with an explicit tag (such as "<dialog_act>" and "<bot_response>"). The final context vectors after a forward pass on the previous bot utterance are used to initialize the hidden states for the current user utterance.

In some embodiments, the same lexical contextual information related to each utterance is used in a context carry over approach. In these embodiments, the dialog act is augmented with an expected slot type if any. An embedding is created from system dialog act and bot response by first concatenating them. The context embedder 409 uses a word embedding module produce word-wise embedding vectors over these representations with a final fixed length embedding is obtained by averaging embedding vectors over the entire contextual sequence.

$$embed_{ctx} = E_{ke}^T [ctx_1; ctx_2 \ldots ; ctx_{xk}]$$

$$embed_i = [embed_{ctx}; embed_i]$$

In these embodiments, $embed_{ctx}$ is the context embedding and $embed_i$ is the word embedding Emb(w(t)) and Emb(w(t-1)) of FIG. 5.

Figure 6:
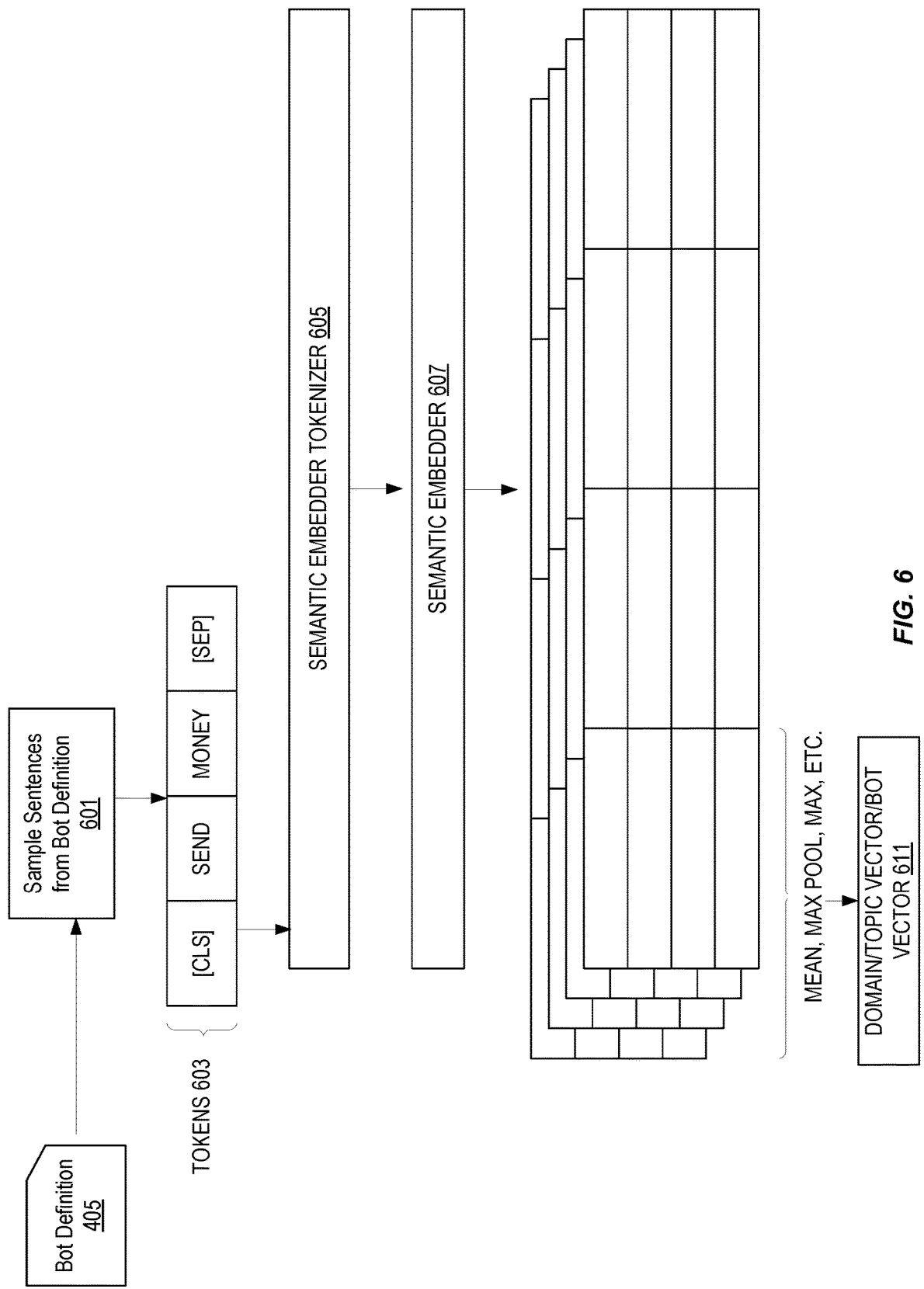
FIG. 6 illustrates embodiments of an exemplary topic model.

In some embodiments, the word embedding is concatenated with the topic vector or domain embedding. In some embodiments, a topic vector is generated by a topic model. FIG. 6 illustrates embodiments of an exemplary topic model. In production chatbot systems, contextual biasing is typically done by utilizing a user-provided definition that lays out the structure of the conversation that is expected in the context of the bot. This definition also contains sample utterances, slot entities and intents. This information is a rich source of biasing information. This information can be utilized by applying a semantic-based model (such as a transformer-based model such as a BERT-based model) to derive contextual embeddings.

At training time, a semantic embedder tokenizer 605 and semantic embedder 607 may be used to obtain embeddings from the CLS token of sample sentences 601 from the bot definition 405. The CLS token is a special classification token that is prefixed to every sequence and the final hidden state corresponding to this token is used as the aggregate sequence representation for classification tasks. In some embodiments, for every domain, these embeddings are subjected to an operation such as an average, max, max pool, etc. to obtain a single fixed length domain embedding, topic vector, and/or bot vector 611. Note that topic and domain vector may be used interchangeably in some embodiments.

At inference time, the sample utterances in the bot definition serve as a proxy for a domain representation for the bot. The closest domain embedding seen at training time is used while decoding the input utterance in the context of the bot. In some embodiments, cosine similarity between domain embeddings seen during training and the one derived from sample utterances in the bot definitions is used to determine the closest domain embedding. In other embodiments, a direct domain embedding calculation is used. In some embodiments, the context embedder 409 makes the determination of which style of domain embedding is to be used. The domain embeddings are concatenated with the word embeddings at every time step before feeding it into the LSTM of the NLM Rescorer 407.

Figure 7:
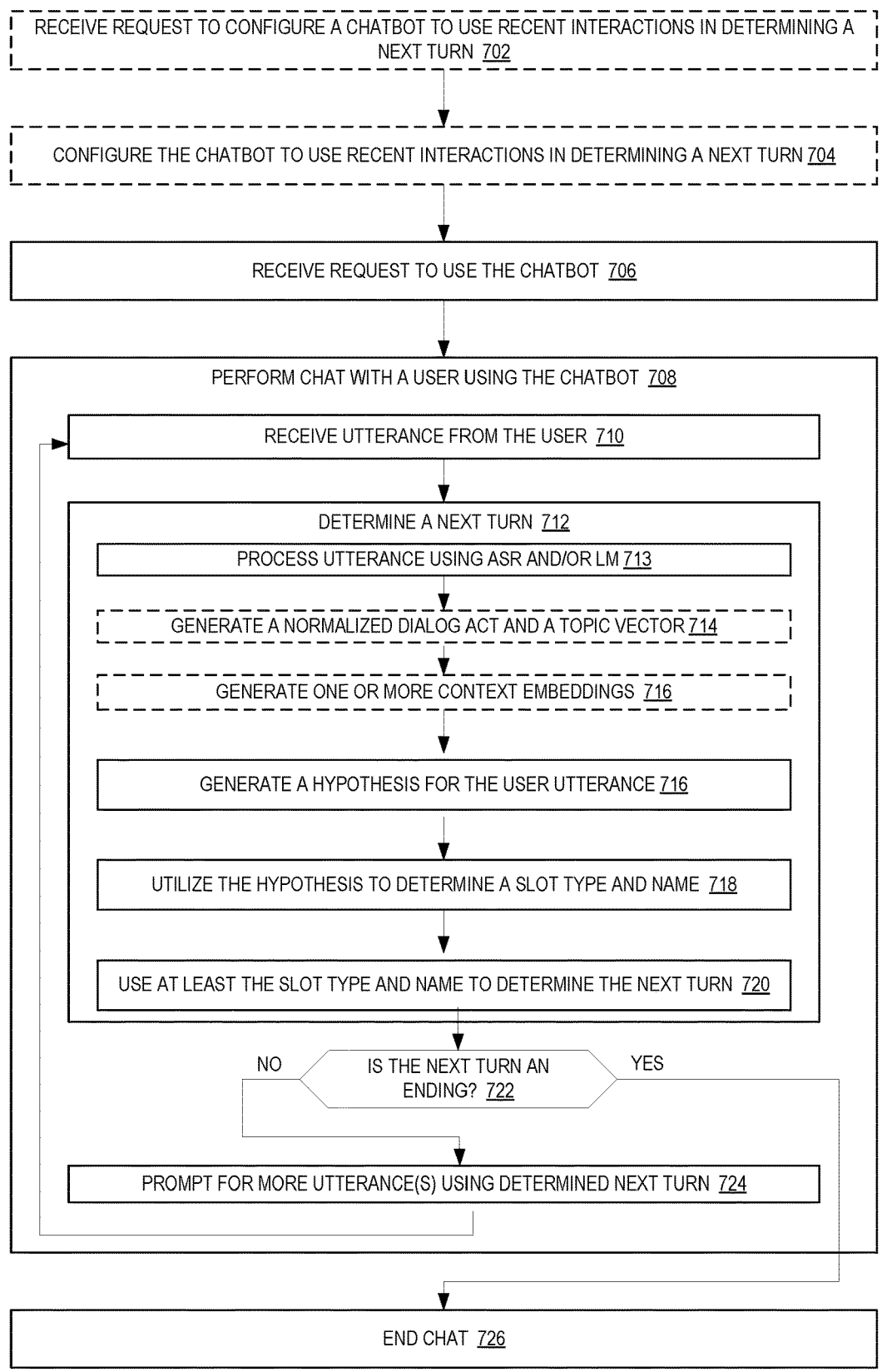
FIG. 7 is a flow diagram illustrating operations of a method of implementing a chatbot according to some embodiments.

FIG. 7 is a flow diagram illustrating operations of a method of implementing a chatbot according to some embodiments. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations are performed by hosted ML services of the other figures.

In some embodiments, at 702, a request to configure a chatbot to use recent interactions in determining a next turn is received. In particular, the request indicates that an identified chatbot is to be trained to at least use recent interactions. In some embodiments, the chatbot may be trained to operate with and without the use of recent interactions. This request may include an identifier of the chatbot definition, a location of training data that is not included with the chatbot definition, what metadata to use for recent interactions such as personalized metadata such as location, time of day, and/or personalized catalog for all utterances spoken to the bot, etc.

In some embodiments, the chatbot is configured according to the request to use recent interactions in determining a next turn at 704. For example, the chatbot is trained to use recent interactions. This training may include, for example, the training discussed above with respect to topic vector generations, the generation and use of context embeddings, etc.

A request to use the chatbot is received at 706. This request may include one or more of an identifier of a chatbot (which may be populated from the clicking of a link, etc.), an identifier of the user, an indication that the chatbot is to use recent interactions and/or other metadata (such as location, etc.), and an indication of an intent. When a user starts a conversation with the bot, a session is created. The information exchanged between the user and the chatbot the session state for the conversation.

A chat with the user is performed using the chatbot at 708. This chat may include several different operations. To manage the conversation, you must send user utterances to the bot until the conversation reaches a logical end. The current conversation is captured in session state. The session state is updated after each user utterance. The session state contains the current state of the conversation and is returned by the bot in a response to each user utterance.

At 710, input is received from the user at a frontend serving as an orchestrator. This input may be in the form of an audio utterance or a text utterance. In some embodiments, the input includes one or more of a session state identifier, a dialog action (such as a SlotToElicit and type), an intent including a slot value, a name, resolved value, etc., an indication of the state, an identifier of the user, location information, and/or an identifier of the bot.

A next turn based on the received input is determined at 712. This action may have several parts. In some embodiments, the input utterance is subjected to ASR and/or a LM to predict (recognize) what was uttered at 713. The prediction (or hypothesis) is used by an NLU model to determine a slot name or type to be filled in by the user. When contextual information is used, this prediction is further refined using a NLM rescorer.

In embodiments that take context into account, a normalized dialog act and a topic vector are generated at 714. The dialog act coming from the input and bot definition and the topic vector generated as detailed above. One or more context embeddings are generated at 716. Again, details of this generation are described above, but the context embeddings take into account the normalized dialog act, topic vector, a previous bot response, and a list of slot options.

A hypothesis is generated for the user utterance output from the LM at 716. When context is taken into account, the hypothesis is generated using contextual embeddings and word embeddings. The hypothesis is used by an NLU model to determine a slot name and/or type at 718.

At least the slot name and/or type is used as a part of a determination of a next turn at 720. Typically, this next turn decision is also based on the bot definition, previous states, action results, a predicted next action, etc.

A determination there is not a next turn is made at 722. The determination at 720 may indicate that the intent has been fulfilled (such as a flight booked). When there is nothing more to do in the chat, it ends at 726. A prompt for more input using the determined next turn is made at 724 when there is more from the user that is required to satisfy the intent.

Figure 8:
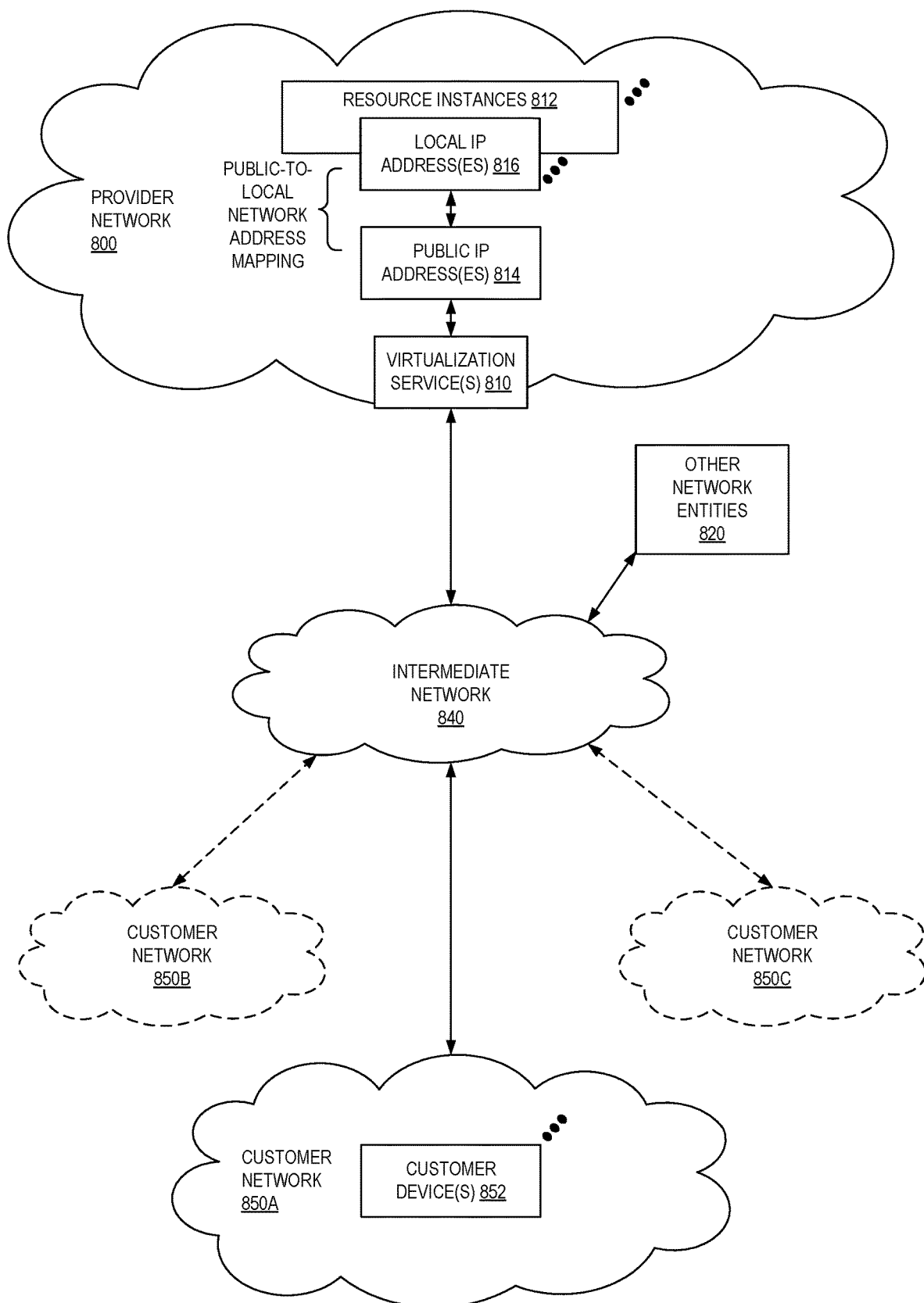
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more customer networks 850A-850C (may also be referred to as client networks) including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
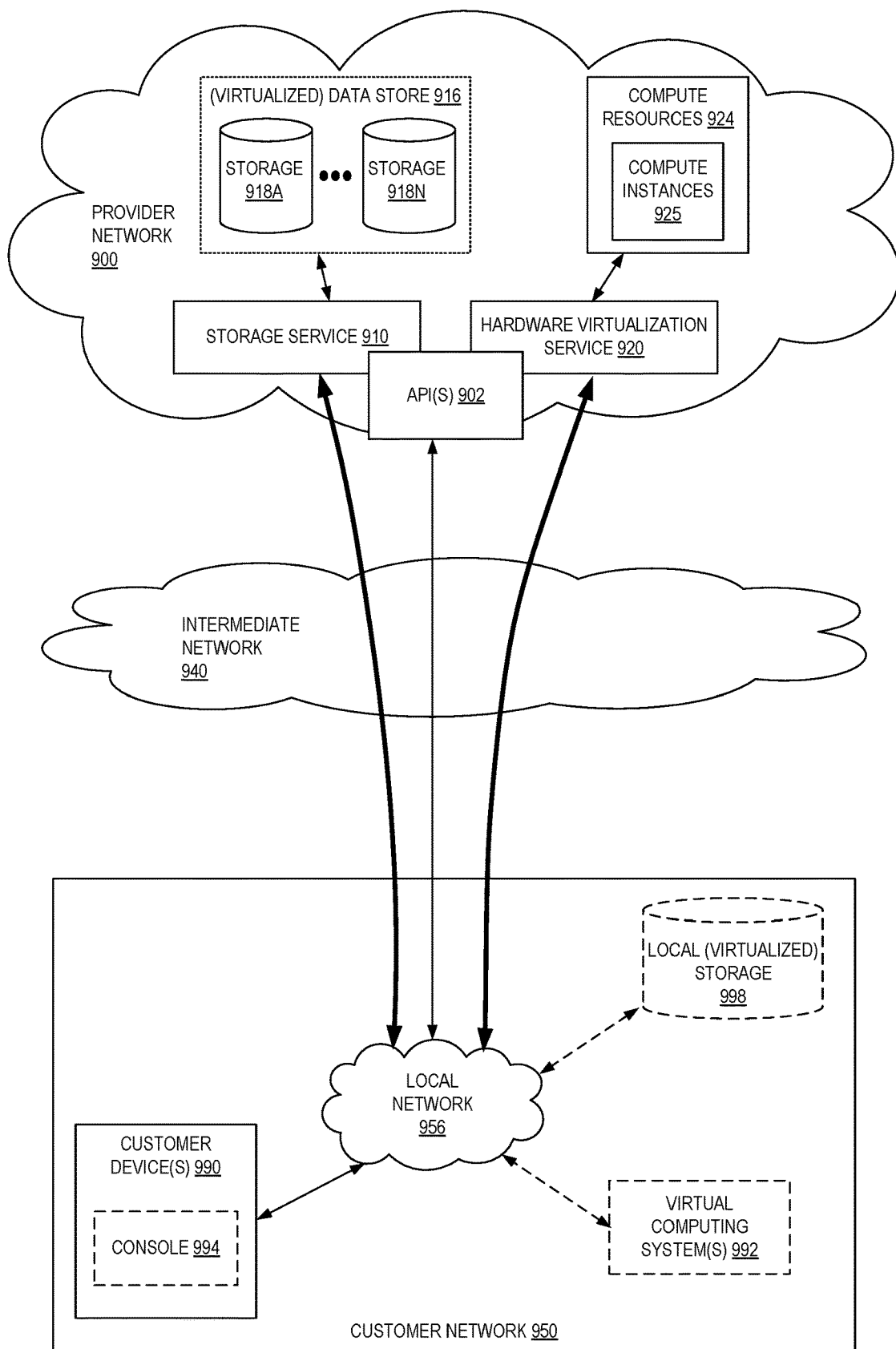
FIG. 9 is a block diagram of an example provider network that provides a storage service and a hardware virtualization service to customers according to some embodiments.

FIG. 9 is a block diagram of an example provider network environment that provides a storage service and a hardware virtualization service to customers, according to some embodiments. A hardware virtualization service 920 provides multiple compute resources 924 (e.g., compute instances 925, such as VMs) to customers. The compute resources 924 may, for example, be rented or leased to customers of a provider network 900 (e.g., to a customer that implements a customer network 950). Each computation resource 924 may be provided with one or more local IP addresses. The provider network 900 may be configured to route packets from the local IP addresses of the compute resources 924 to public Internet destinations, and from public Internet sources to the local IP addresses of the compute resources 924.

The provider network 900 may provide the customer network 950, for example coupled to an intermediate network 940 via a local network 956, the ability to implement virtual computing systems 992 via the hardware virtualization service 920 coupled to the intermediate network 940 and to the provider network 900. In some embodiments, the hardware virtualization service 920 may provide one or more APIs 902, for example a web services interface, via which the customer network 950 may access functionality provided by the hardware virtualization service 920, for example via a console 994 (e.g., a web-based application, standalone application, mobile application, etc.) of a customer device 990. In some embodiments, at the provider network 900, each virtual computing system 992 at the customer network 950 may correspond to a computation resource 924 that is leased, rented, or otherwise provided to the customer network 950.

From an instance of the virtual computing system(s) 992 and/or another customer device 990 (e.g., via console 994), the customer may access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some embodiments, a virtualized data store gateway (not shown) may be provided at the customer network 950 that may locally cache at least some data, for example frequently accessed or critical data, and that may communicate with the storage service 910 via one or more communications channels to upload new or modified data from a local cache so that the primary store of data (the virtualized data store 916) is maintained. In some embodiments, a user, via the virtual computing system 992 and/or another customer device 990, may mount and access virtual data store 916 volumes via the storage service 910 acting as a storage virtualization service, and these volumes may appear to the user as local (virtualized) storage 998.

While not shown in FIG. 9, the virtualization service(s) may also be accessed from resource instances within the provider network 900 via the API(s) 902. For example, a customer, appliance service provider, or other entity may access a virtualization service from within a respective virtual network on the provider network 900 via the API(s) 902 to request allocation of one or more resource instances within the virtual network or within another virtual network.

Illustrative Systems

Figure 10:
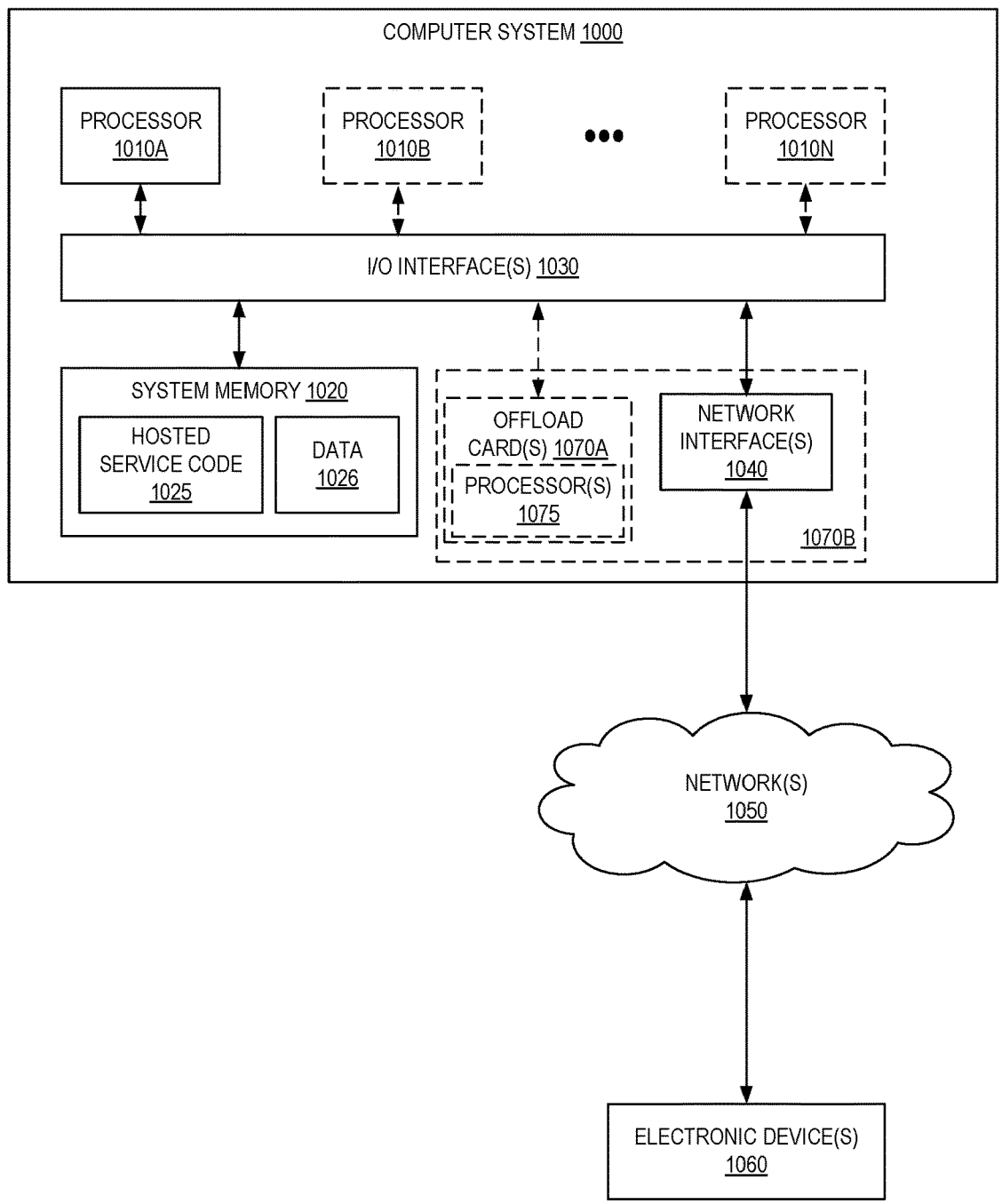
FIG. 10 is a block diagram illustrating an example computer system that may be used in some embodiments.

In some embodiments, a system that implements a portion or all of the techniques described herein may include a general-purpose computer system, such as the computer system 1000 illustrated in FIG. 10, that includes, or is configured to access, one or more computer-accessible media. In the illustrated embodiment, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various embodiments the computer system 1000 may include one computing device or any number of computing devices configured to work together as a single computer system 1000.

In various embodiments, the computer system 1000 may be a uniprocessor system including one processor 1010, or a multiprocessor system including several processors 1010 (e.g., two, four, eight, or another suitable number). The processor(s) 1010 may be any suitable processor(s) capable of executing instructions. For example, in various embodiments, the processor(s) 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 may commonly, but not necessarily, implement the same ISA.

The system memory 1020 may store instructions and data accessible by the processor(s) 1010. In various embodiments, the system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 1020 as hosted service code 1025 (e.g., executable to implement, in whole or in part, the chatbot service 400) and data 1026.

In one embodiment, the I/O interface 1030 may be configured to coordinate I/O traffic between the processor 1010, the system memory 1020, and any peripheral devices in the device, including the network interface 1040 and/or other peripheral interfaces (not shown). In some embodiments, the I/O interface 1030 may perform any necessary protocol, timing, or other data transformations to convert data signals from one component (e.g., the system memory 1020) into a format suitable for use by another component (e.g., the processor 1010). In some embodiments, the I/O interface 1030 may include support for devices attached through various types of peripheral buses, such as a variant of the Peripheral Component Interconnect (PCI) bus standard or the Universal Serial Bus (USB) standard, for example. In some embodiments, the function of the I/O interface 1030 may be split into two or more separate components, such as a north bridge and a south bridge, for example. Also, in some embodiments, some or all of the functionality of the I/O interface 1030, such as an interface to the system memory 1020, may be incorporated directly into the processor 1010.

The network interface 1040 may be configured to allow data to be exchanged between the computer system 1000 and other devices 1060 attached to a network or networks 1050, such as other computer systems or devices as illustrated in FIG. 1, for example. In various embodiments, the network interface 1040 may support communication via any suitable wired or wireless general data networks, such as types of Ethernet network, for example. Additionally, the network interface 1040 may support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a Quick-Path interconnect (QPI) or UltraPath interconnect (UPI)). For example, in some embodiments the computer system 1000 may act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some embodiments the offload card(s) 1070A or 1070B can perform compute instance management operations, such as pausing and/or un-pausing compute instances, launching and/or terminating compute instances, performing memory transfer/copying operations, etc. These management operations may, in some embodiments, be performed by the offload card(s) 1070A or 1070B in coordination with a hypervisor (e.g., upon a request from a hypervisor) that is executed by the other processors 1010A-1010N of the computer system 1000. However, in some embodiments the virtualization manager implemented by the offload card(s) 1070A or 1070B can accommodate requests from other entities (e.g., from compute instances themselves), and may not coordinate with (or service) any separate hypervisor.

In some embodiments, the system memory 1020 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include any non-transitory storage media or memory media such as magnetic or optical media, e.g., disk or DVD/CD coupled to the computer system 1000 via the I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of the computer system 1000 as the system memory 1020 or another type of memory. Further, a computer-accessible medium may include transmission media or signals such as electrical, electromagnetic, or digital signals, conveyed via a communication medium such as a network and/or a wireless link, such as may be implemented via the network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to interact with a chatbot hosted by a provider network, wherein the chatbot is capable of utilizing contextual information or not using contextual information;
   receiving an utterance;
   in response to receiving the utterance:
      applying a language model to the utterance to determine a probability of a sequence of words, generating a context vector embedding for the utterance based on contextual metadata, the contextual metadata including one or more of:
         a dialog act as defined by a chatbot definition of the chatbot,
         a topic vector identifying a domain of the chatbot,
         a previous chatbot response, or
         one or more slot options;
      performing neural language model rescoring using the probability of a sequence of words as word embeddings and the context vector embedding to predict a hypothesis;
      determining at least a name of a slot to be fulfilled based at least in part on the hypothesis and the chatbot definition; and
      determining a next turn based at least in part on the chatbot definition, any previous state, and the name of the slot to be fulfilled; and
   providing a prompt for input for the next turn.

2. The computer-implemented method of claim 1, wherein the request includes one or more of an identifier of the chatbot, an identifier of the user, and an indication of an intent.

3. The computer-implemented method of claim 2, wherein the chatbot definition includes at least one or more of a conversation flow, intent details, contexts that set input and output contexts for the intent, sample utterances, slots, confirmation prompts and declination responses, closing responses (text, sent to the user after the intent is fulfilled), or codehooks.

4. A computer-implemented method comprising:
   receiving a request to interact with a chatbot;
   receiving an utterance;
   in response to receiving the utterance:
      applying a language model to the utterance to determine a probability of a sequence of words,
      generating a context vector embedding for the utterance based at least on contextual metadata, the contextual metadata including one or more of:
         a dialog act as defined by a chatbot definition of the chatbot,
         a topic vector identifying a domain of the chatbot,
         a previous chatbot response, or
         one or more slot options;
      performing neural language model rescoring using the determined probability of a sequence of words as a word embedding and the context vector embedding to predict a hypothesis;
      determining at least a name of a slot and type to be fulfilled based at least in part on the hypothesis and the chatbot definition; and
      determining a next turn based at least in part on the chatbot definition, any previous state, and the name of the slot and type to be fulfilled; and
   providing a prompt for input for the next turn.

5. The computer-implemented method of claim 4, wherein the request includes one or more of an identifier of the chatbot, an identifier of the user, and an indication of an intent.

6. The computer-implemented method of claim 4, wherein the context vector embedding is for the user.

7. The computer-implemented method of claim 4, wherein the chatbot definition includes at least one or more of a conversation flow, intent details, contexts that set input and output contexts for the intent, sample utterances, slots, confirmation prompts and declination responses, closing responses, or codehooks.

8. The computer-implemented method of claim 4, wherein the neural language model rescoring is performed using a neural language model rescoring comprising a plurality of long short-term memory (LSTM) components that are coupled to softmax functions, the LSTM components to receive the context vector embedding and a word embedding.

9. The computer-implemented method of claim 4, wherein the topic vector is generated using a semantic embedding model.

10. The computer-implemented method of claim 9, wherein the semantic embedding model is to be trained on classes from sample utterances of the chatbot definition.

11. The computer-implemented method of claim 4, further comprising:
    applying an acoustic model to the utterance prior to using the language model.

12. The computer-implemented method of claim 4, wherein the context vector embedding is further based at least on one or more of a user identifier, location data, time, language, video data, and an image representation.

13. The computer-implemented method of claim 4, further comprising:
    receiving a request to configure the chatbot to use recent interactions in determining a next turn; and
    training the chatbot to use recent interactions.

14. The computer-implemented method of claim 13, further comprising:
    training the chatbot to not use recent interactions.

15. A system comprising:
    a first one or more electronic devices to implement a storage service in a multi-tenant provider network; and
    a second one or more electronic devices to implement a chatbot service in the multi-tenant provider network, the chatbot service including instructions that upon execution cause a chatbot stored in the storage service to:
receive a request to interact with the chatbot of the chatbot service;
receive an utterance;
in response to receiving the utterance:
  applying a language model to the utterance to determine a probability of a sequence of words;
  generating a context vector embedding for the utterance based at least on contextual metadata, the contextual metadata including one or more of:
    a dialog act as defined by a chatbot definition of the chatbot,
    a topic vector identifying a domain of the chatbot,
    a previous chatbot response, or
    one or more slot options;
  performing neural language model rescoring using the probability of a sequence of words as a word embedding and the context vector embedding to predict a hypothesis;
  determining at least a name of a slot and type to be fulfilled based at least in part on the hypothesis and the chatbot definition; and
  determining a next turn based at least in part on the chatbot definition, any previous state, and the name of the slot and type to be fulfilled; and
  prompt the user for input for the next turn.

16. The system of claim 15, wherein the request includes one or more of an identifier of the chatbot, an identifier of the user, and an indication of an intent.

17. The system of claim 16, wherein the chatbot definition includes at least one or more of a conversation flow, intent details, contexts that set input and output contexts for the intent, sample utterances, slots, confirmation prompts and declination responses, closing responses, or codehooks.

18. The system of claim 15, wherein the chatbot is to apply an acoustic model to the utterance prior to using the language model.

19. The system of claim 15, wherein the context vector embedding is further based at least on one or more of a user identifier, location data, time, language, video data, and an image representation.

20. The system of claim 15, wherein the chatbot is trained to utilize context vector embeddings and not utilize context vector embeddings.

* * * * *